US008429456B2

(12) United States Patent
Adams et al.

(10) Patent No.: US 8,429,456 B2
(45) Date of Patent: *Apr. 23, 2013

(54) METHOD AND APPARATUS FOR PROVIDING INTELLIGENT ERROR MESSAGING

(75) Inventors: Neil Patrick Adams, Kitchener (CA);
Herbert Anthony Little, Waterloo (CA);
Michael Stephen Brown, Kitchener (CA); Michael Grant Kirkup, Waterloo (CA); Michael Kenneth Brown, Fergus (CA)

(73) Assignee: Research In Motion Limited, Waterloo, Ontario (CA)

( * ) Notice: Subject to any disclaimer, the term of this patent is extended or adjusted under 35 U.S.C. 154(b) by 118 days.

This patent is subject to a terminal disclaimer.

(21) Appl. No.: 13/075,629

(22) Filed: Mar. 30, 2011

(65) Prior Publication Data

US 2011/0191642 A1    Aug. 4, 2011

Related U.S. Application Data

(63) Continuation of application No. 12/886,065, filed on Sep. 20, 2010, now Pat. No. 7,930,591, which is a continuation of application No. 12/407,834, filed on Mar. 20, 2009, now Pat. No. 7,802,139, which is a continuation of application No. 10/895,991, filed on Jul. 22, 2004, now Pat. No. 7,565,577.

(51) Int. Cl.
*G06F 11/00* (2006.01)

(52) U.S. Cl.
USPC ............................................. 714/27

(58) Field of Classification Search ............... 714/27
See application file for complete search history.

(56) References Cited

U.S. PATENT DOCUMENTS

| | | | |
|---|---|---|---|
| 4,866,712 A | 9/1989 | Chao | |
| 6,219,694 B1 | 4/2001 | Lazaridis et al. | |
| 6,308,140 B1 | 10/2001 | Dowling et al. | |
| 6,681,344 B1 | 1/2004 | Andrew | |
| 7,058,860 B2 | 6/2006 | Miller et al. | |
| 7,225,162 B2 | 5/2007 | Kim et al. | |
| 7,363,495 B2 | 4/2008 | Felt et al. | |
| 7,565,577 B2 | 7/2009 | Adams et al. | |
| 7,802,139 B2 | 9/2010 | Adams et al. | |
| 2002/0144148 A1 | 10/2002 | Hashem et al. | |
| 2002/0146132 A1 | 10/2002 | Medvinsky | |
| 2002/0169954 A1 | 11/2002 | Bandini et al. | |
| 2002/0194319 A1 | 12/2002 | Ritchie | |
| 2002/0199119 A1 | 12/2002 | Dunnion et al. | |
| 2003/0005362 A1 | 1/2003 | Miller et al. | |
| 2004/0148356 A1 | 7/2004 | Bishop et al. | |

(Continued)

FOREIGN PATENT DOCUMENTS

CA    2475561    10/2010

OTHER PUBLICATIONS

Canadian Office Action dated Apr. 23, 2009, Canadian Patent Application No. 2,475,561.

(Continued)

*Primary Examiner* — Bryce Bonzo
(74) *Attorney, Agent, or Firm* — Fish & Richardson P.C.

(57) ABSTRACT

A method and apparatus for providing intelligent error messaging is disclosed wherein a user of a mobile communications device is provided with descriptive error messaging information to assist the user in overcoming errors associated with the processing of electronic messages and data.

24 Claims, 6 Drawing Sheets

U.S. PATENT DOCUMENTS

| | | |
|---|---|---|
| 2004/0168055 A1 | 8/2004 | Lord et al. |
| 2005/0033974 A1 | 2/2005 | Ansell et al. |
| 2005/0038991 A1 | 2/2005 | Brown et al. |
| 2005/0055259 A1 | 3/2005 | Kuo et al. |
| 2005/0160335 A1 | 7/2005 | Peterson |
| 2006/0005257 A1 | 1/2006 | Tohru et al. |
| 2006/0212716 A1 | 9/2006 | Ruddle |
| 2006/0248342 A1 | 11/2006 | Bajar et al. |
| 2006/0288219 A1 | 12/2006 | Adams et al. |
| 2007/0036300 A1 | 2/2007 | Brown et al. |
| 2007/0038704 A1 | 2/2007 | Brown et al. |
| 2007/0038719 A1 | 2/2007 | Brown et al. |
| 2009/0187796 A1 | 7/2009 | Adams et al. |

OTHER PUBLICATIONS

Canadian Notice of Allowance dated Jan. 28, 2010, Canadian Patent Application No. 2,475,561.

U.S. Notice of Allowance dated Dec. 16, 2010, U.S. Appl. No. 12/886,065.

Using: Desktop (S/MIME)
Message Status: Opened
To: John Doe
Sent: Month/Date/Year/Time
From: Jane Doe
Subject:

 This S/MIME message is encrypted but cannot be decrypted because the required private key is not present on your handheld. ▼

*Fig. 6A*

▲ You may update your handheld's key store using the certificate synchronization software in the desktop manager.

The missing certificate corresponds to one of the following serial number, issuer pairs:
• 01AB F7BA 0000 0000 002E, Crypto-Test-CA-MSCA■

*Fig. 6B*

METHOD AND APPARATUS FOR PROVIDING INTELLIGENT ERROR MESSAGING

CROSS-REFERENCE TO RELATED APPLICATIONS

This application is a continuation of, and claims priority to, prior U.S. patent application Ser. No. 12/886,065 filed on Sep. 20, 2010, which is a continuation of U.S. patent application Ser. No. 12/407,834, filed on Mar. 20, 2009, which is a continuation of U.S. patent application Ser. No. 10/895,991, filed on Jul. 22, 2004. U.S. patent application Ser. No. 12/407,834 issued to patent as U.S. Pat. No. 7,802,139. U.S. patent application Ser. No. 10/895,991 issued to patent as U.S. Pat. No. 7,565,577. The entirety of U.S. patent application Ser. No. 12/886,065, U.S. patent application Ser. No. 12/407,834 and U.S. patent application Ser. No. 10/895,991 are hereby incorporated by reference.

FIELD OF THE INVENTION

The present invention relates generally to mobile wireless communications devices capable of processing cryptographically secure messages and information. In particular, the disclosure is directed to a method and apparatus for providing a user of a mobile wireless communications device with descriptive error messaging information to assist the user in decrypting a cryptographically secured message where information necessary for decrypting the message, such as, for example, a particular private key(s), are not present on the user's mobile wireless communications device.

RELATED ART

Exchanging cryptographically secured electronic messages and data, such as, for example, e-mail messages, is well known. Typically, the user of a device for receiving such cryptographically secured electronic information, such as, for example, a mobile wireless communications device, is provided with a store containing private keys, certificates, and the like, required for decrypting various cryptographically secured information. Occasionally, the secure message may be encrypted with a public key for which the store of the mobile wireless communications device does not include a corresponding private key or certificate for decrypting the message.

Existing e-mail processing software, such as, for example, Microsoft Outlook™, does not provide any detailed information when a decryption error is detected. The error messages provided by such conventional systems are typically cryptic error messages that do not describe exactly what the problem is or what needs to be done to overcome the problem. For example, in an instance where a cryptographically secured e-mail message cannot be decrypted because the user's communication device (e.g., a wireless handheld device, desktop, etc.) does not have the corresponding private key of a public key private key pair, that is necessary for properly decrypting the message, conventional systems merely provide a cryptic, terse and uninformative message, such as, for example, "Can't open this item. Your digital ID name cannot be found by the underlying security system." Messages of this type provide the typical user who is unfamiliar with cryptographically secured messaging with little helpful information for remedying the problem so that the message can be decrypted and read. This uninformative error messaging tends to confuse and frustrate users who merely want to be able to read the message.

This problem is further exacerbated in systems employing certificates with relatively small validity protocols or by key inventories that have high rollover rates. As described above, the information typically provided by conventional e-mail processing software tends only to indicate the existence of a problem, for example, that a message cannot be decrypted, but does not provide the unsophisticated user with enough information to solve the problem. In other words, merely identifying the existence of a problem without providing any remedial information to assist the user in overcoming the problem is a fundamental drawback of conventional cryptographically secured electronic messaging systems, such as, for example, wireless handheld communications devices.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which:

FIGS. 6A and 6B are illustrative depictions showing exemplary error messaging in accordance with the exemplary embodiments discussed above.

DETAILED DESCRIPTION OF EXEMPLARY EMBODIMENTS

In view of the foregoing, we have now recognized the need for a method and apparatus for providing detailed error messaging to enable the user of cryptographically secured electronic messaging not only to identify the existence of a fault or problem, but that also provides information to enable the user to correct the identified problem and to read the encrypted message.

To this end, it is advantageous to provide sufficient understandable and helpful information to a user so that in most typical cryptographic error situations, the user will be aware of exactly what is causing the problem, how to overcome the problem and what, if any, additional information may be required to be downloaded to the user device to overcome the problem.

For example, according to a preferred embodiment of the invention, when a user attempts to open a cryptographically secured message on the user's wireless communications device, and a problem is encountered, the user is provided with at least the following: (1) an indication of exactly what problem is preventing opening of the message, for example, the message is encrypted but cannot be decrypted because the required private key is not present on the user's device; (2) an indication of how the problem may be solved, for example, the user may update the device's key store using certificate synchronization software in the device's desktop manager; and (3) indicating to the user exactly what information needs to be loaded on to the user's device, for example, the missing certificate corresponds to one of the following serial number/issuer pairs: XX, YY, etc.

The foregoing provides users who are typically unfamiliar with secured messaging with more than a cryptic error message that merely indicates the existence of a problem. It provides the uninitiated user with information that describes exactly what the problem is, how to update the user's device to solve the problem, and what information/data is required to overcome the problem. The solution provided herein will alleviate significant user frustration and confusion that typically occurs when only cryptic error messages are provided without any useful information for overcoming the problem being encountered.

These and other advantages attendant therewith are provided by exemplary embodiments of the invention wherein a method and apparatus for providing detailed error messaging, including information to assist a user in overcoming the error, includes: identifying an error, providing an error message identifying the existence of an error, the error message including: providing a detailed description of the source of the error; providing a description of what procedures may be undertaken by the user to overcome the error; and providing an indication of what information must be downloaded to the user's device to overcome the problem.

Figure 1:
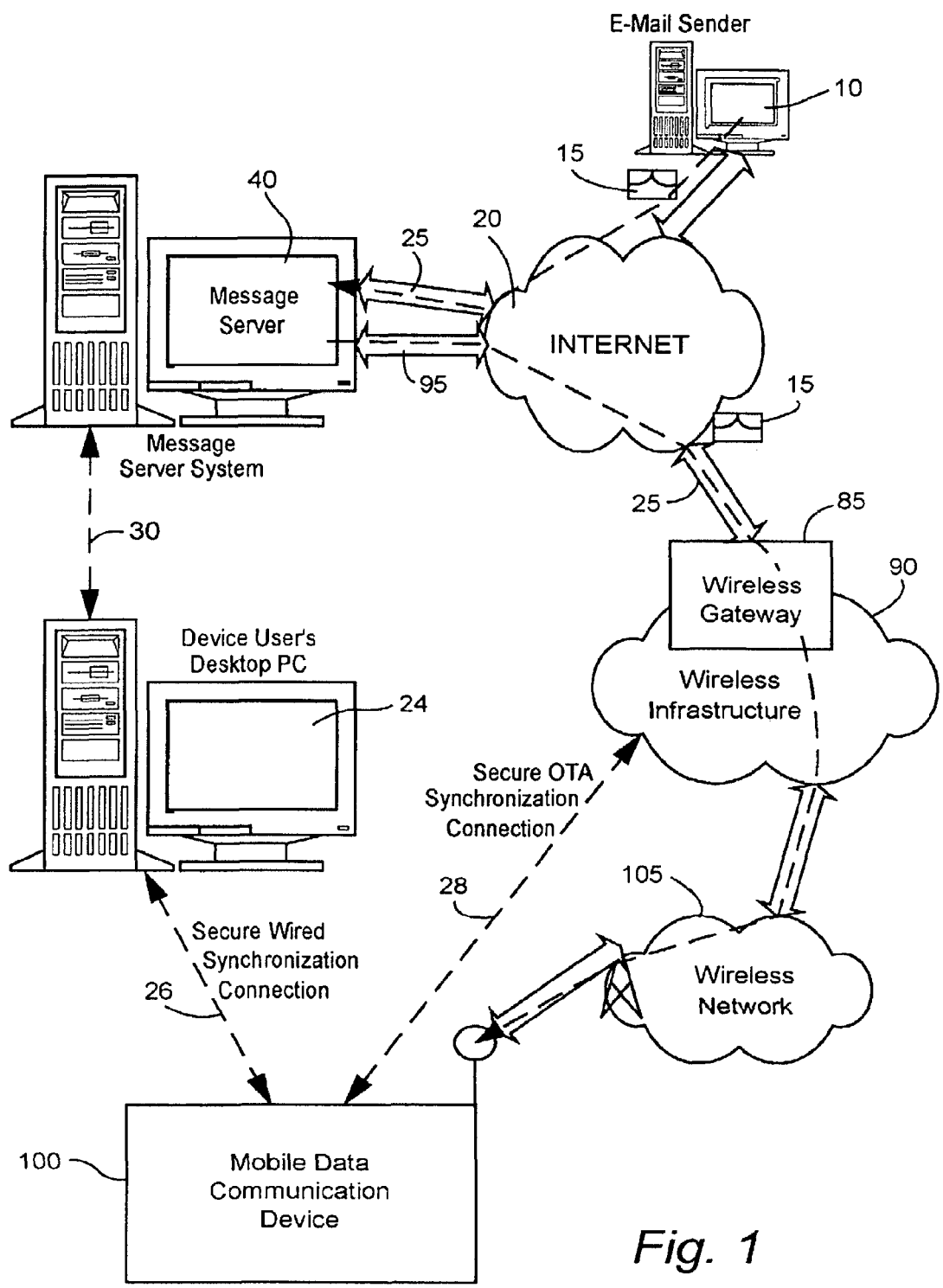
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "Wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
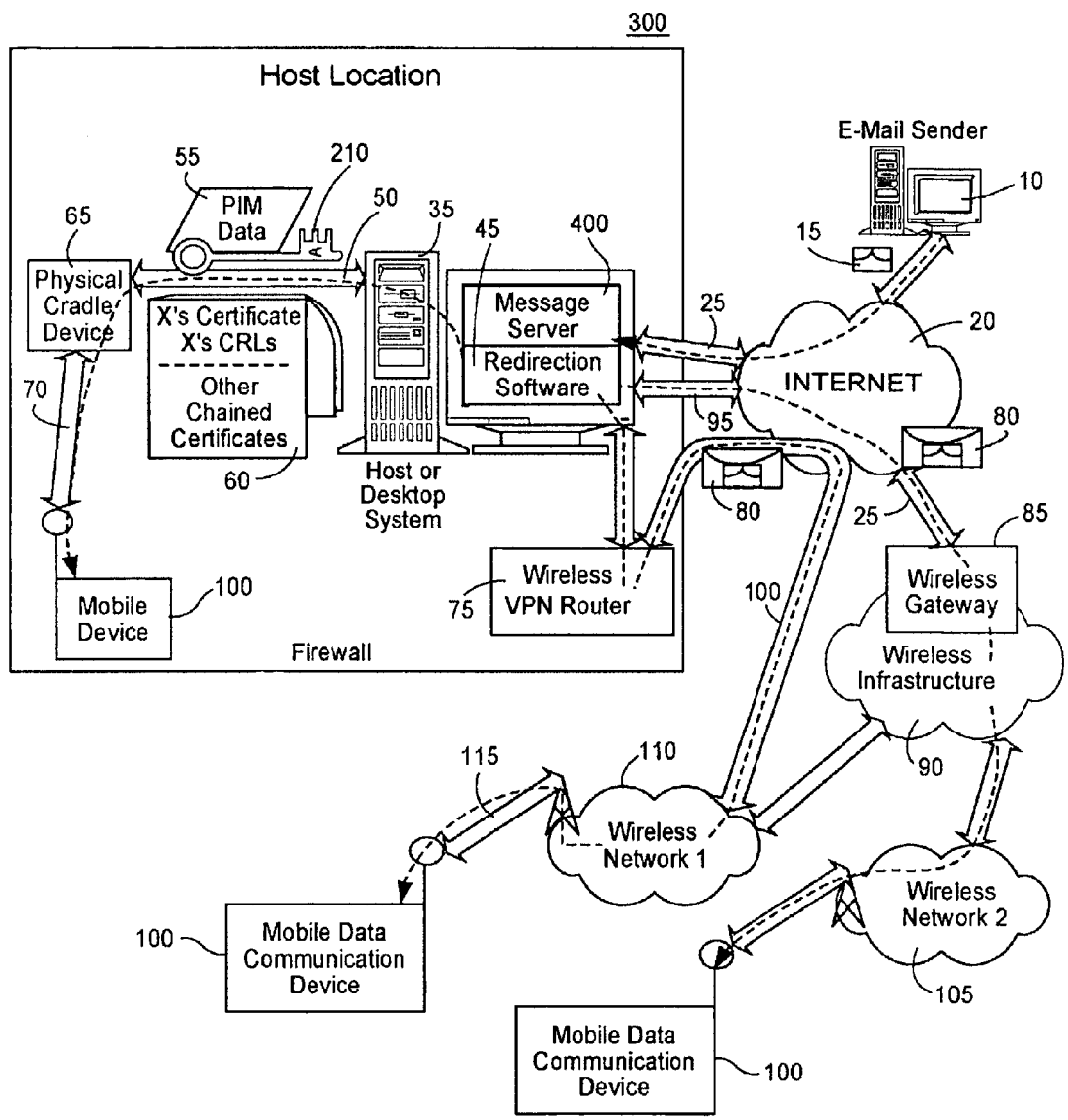
FIG. 2 is a block diagram of a further examplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
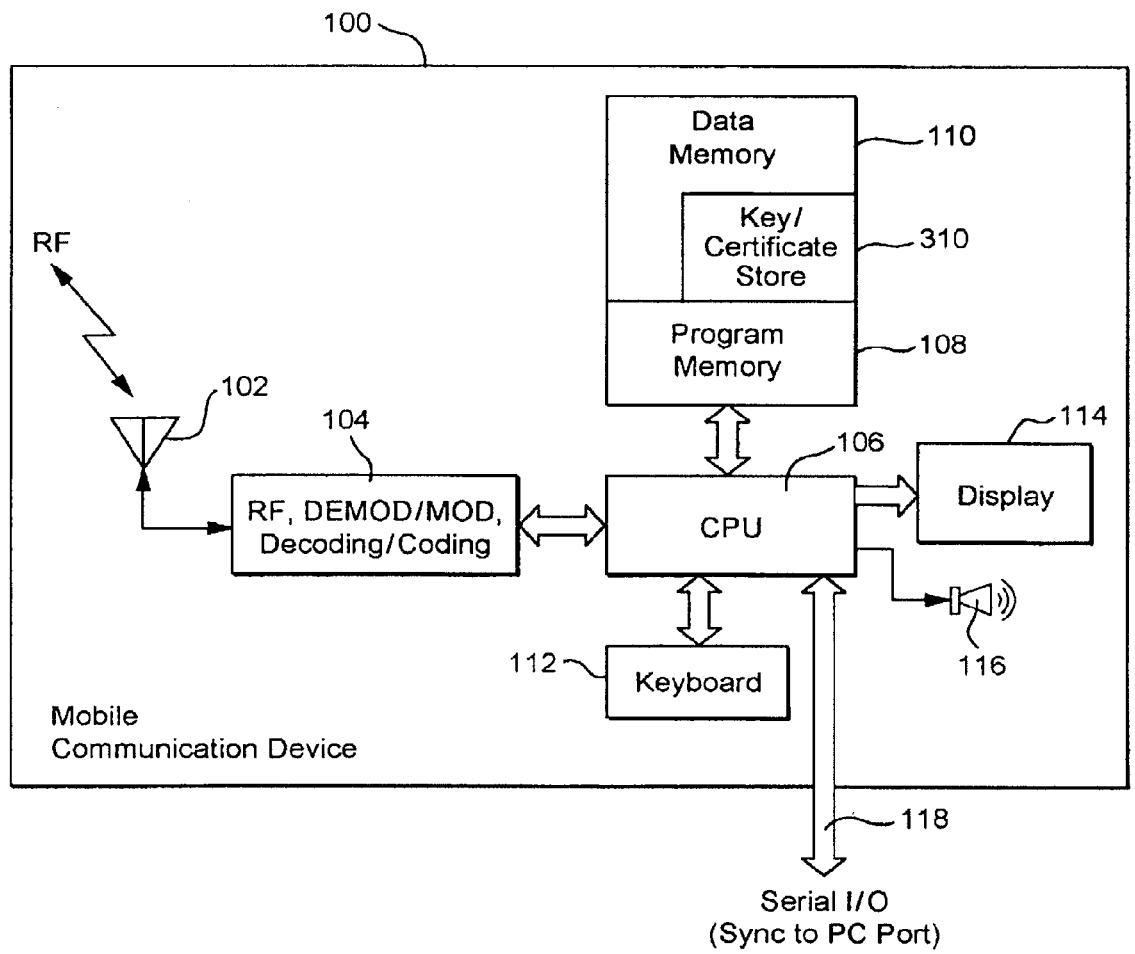
FIG. 3 is an abbreviated schematic diagram of hardware included within an exemplary mobile wireless communications device.

As depicted in FIG. 3, mobile communications device 100 includes a suitable RF antenna 102 for wireless communication to/from a wireless network. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 20, wireless gateway 16 and wireless infrastructure 18 via the OTA synchronization connection 28.

Figure 4:
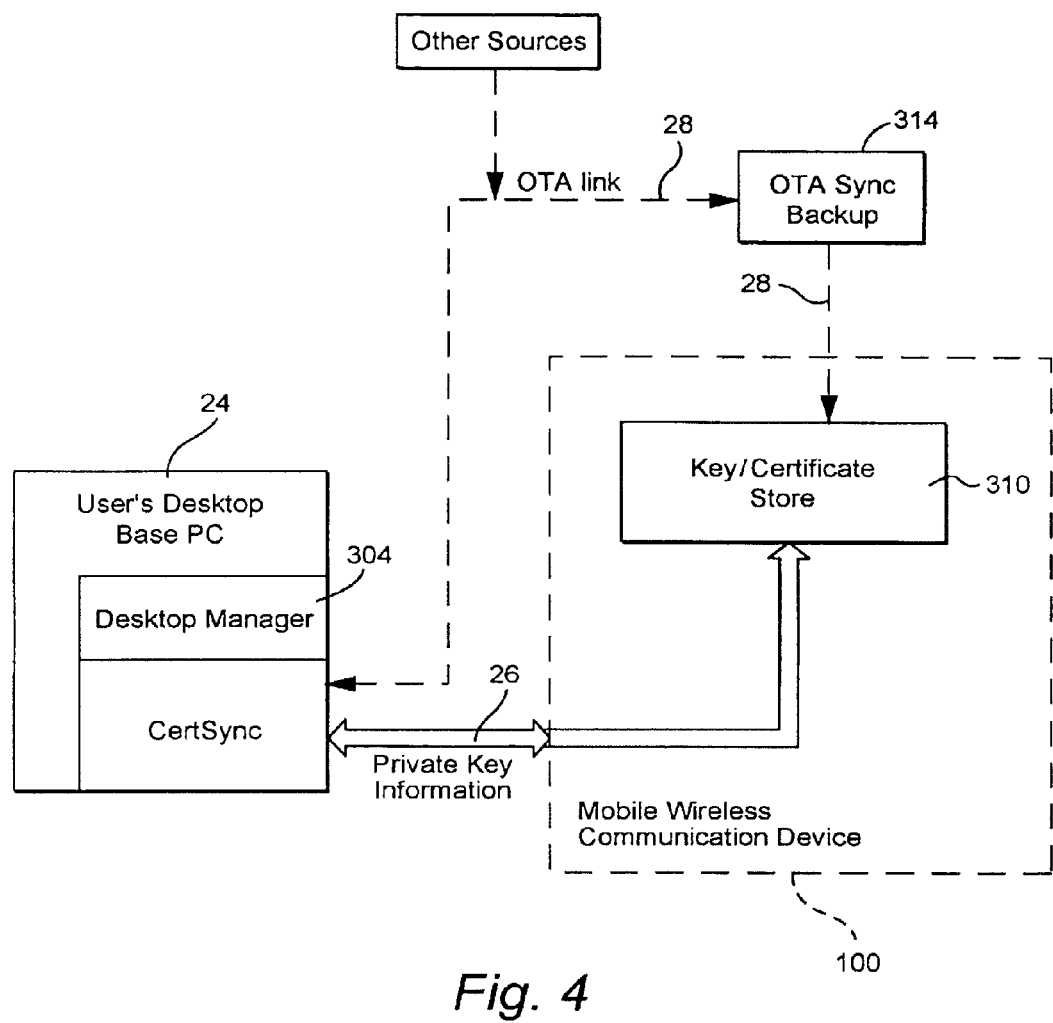
FIG. 4 is an abbreviated schematic functional diagram of the hardware/software utilized to achieve updating of the mobile wireless communication device key/certificate store in the exemplary embodiment of FIG. 1.

As depicted in FIG. 4, the user's base unit 24 may be used to update the mobile wireless communications device 100 with information including, for example, private key information and digital certificate information. The user's base station 24 is typically a desktop PC, and may be of conventional hardware and operating system design. It will typically include desktop manager program logic 304 (in the form of, for example, executable computer program logic) for managing, among other things, a normal data synchronization connection to device 100. As previously mentioned, in the environment of mobile wireless communications systems, such a desktop manager may typically include logic for synchronizing cryptographic message certificates. Such logic is denoted here as Cert Sync. Optionally, an OTA synchronization connection may also be available via an OTA link 28 and OTA sync backup 314.

E-mail messages generated using the S/MIME and PGP techniques may include encrypted information, a digital signature on the message contents, or both. In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 5:
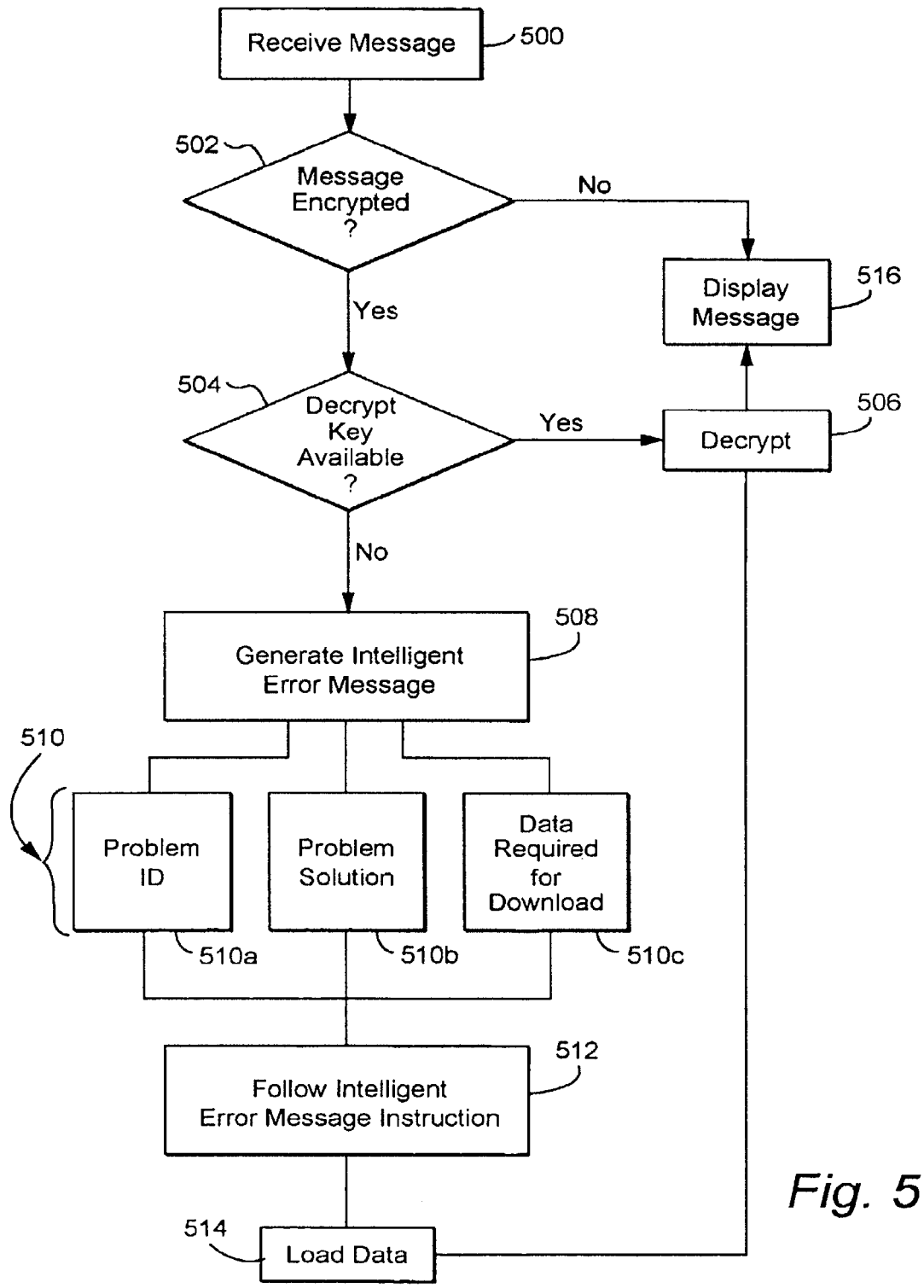
FIG. 5 is an exemplary abbreviated schematic flow diagram of an error messaging program according to an exemplary embodiment of the present invention.

FIG. 5 illustrates an exemplary embodiment of the present disclosure wherein intelligent error messaging is provided. If a user receives a message at his or her handheld device 500, the device first determines if the message is encrypted in step 502. If the message is not encrypted, the message is displayed to the user in step 516. On the other hand, if the message is determined to be encrypted, the program logic then determines if the appropriate private key is present on the user's device 504. If the private key is present on the user's device, the message is decrypted 506 and then displayed on the user's device 516. If, however, there is a problem, such as, for example, a determination in step 504 that the appropriate private key or certificate is not available, intelligent error messaging according to an exemplary embodiment of the disclosure is provided.

When an exemplary error, such as that illustrated above occurs, the program logic of the user's device provided with intelligent error messaging provides detailed information for correcting or overcoming the error 510. According to the intelligent error messaging, the program logic determines, among other things, exactly what the problem is with the message, and displays an appropriate descriptive indication of what error has been detected 510*a*. In this illustrative example, a message such as "This S/MIME message is encrypted but cannot be decrypted because the required private key is not present on your handheld" may be displayed. This message describes in understandable terms the problem being encountered in displaying a received message. Thus, the user is not left wondering or guessing as to the cause of the error.

After displaying the detailed descriptive error message identifying the problem being encountered 510*a*, a descriptive message detailing how the problem may be solved is displayed 510*b*. It will be understood that this message may be automatically displayed or displayed in response to a user input. In any event, according to this exemplary illustration, a message telling the user exactly how to solve the problem is displayed, for example, how to get a private key on to the user device. For example, a message along the lines of "You may update your handheld's key store using the certificate synchronization software in the desktop manager." Now, the user has been informed of exactly what problem has occurred, and what steps to take to solve the problem. However, it still remains that the user must now be informed as to what data must be loaded onto the user's device when implementing, for example, the desktop manager.

To that end, an advantageous feature of the instant exemplary embodiment is the display 510*c* of a further message informing the user exactly which certificates need to be loaded with the message to provide the user's device with the appropriate data for decrypting the message, including which certificates include the necessary information. For example, a message such as "The missing certificate corresponds to one of the following serial number, issuer pairs: serial number X, issuer X; serial number Y, issuer Y, etc."

After all of the intelligent error messaging information 510*a*, 510*b*, 510*c* is provided to the user, the user may further be prompted to follow the instructions provided 512, and load the appropriate data onto the user's device 514. Upon completing the error correction steps, the message may then be decrypted 506 for display to the user 516.

FIGS. 6A and 6B are illustrative depictions showing exemplary error messaging in accordance with the exemplary embodiments discussed above. As shown in FIG. 6A, an indication of what type of error has occurred is displayed on the mobile device. For example, the display indicates that the S/MIME message cannot be decrypted because the required private key is not present on the mobile device. FIG. 6B illustrates further error messaging in accordance with exemplary embodiments of the invention. For example, as shown in FIG. 6B, the display of the mobile device indicates how the user may obtain the missing information, and what that information may be.

It will be understood that the above intelligent error messaging described with respect to decryption of encrypted e-mail messages is intended to be illustrative only. It will be apparent to those skilled in the art that this type of intelligent error messaging has wide ranging application in unlimited and innumerable applications, especially those encountered in the computer and electronics fields. Thus, the exemplary embodiment described above may be equally applicable to use in computer programs, internet browsing, data processing and the like, where errors that are correctable by a user may occur frequently.

The invention claimed is:

1. An electronic communications device comprising:
a display; and
a processor coupled with the display, the processor being operable to determine whether there is an error that prevents decrypting of an encrypted message, and
when there is an error that prevents the decrypting of the encrypted message, display an indication of how to correct the error,
wherein the electronic communications device is further operable to be coupled to a personal computer, and the indication of how to correct the error comprises a direction to use software on the personal computer.

2. The electronic communications device of claim 1, wherein the indication further comprises an indication of how to obtain a key for use in decrypting the encrypted message.

3. The electronic communications device of claim 1, wherein the processor is further operable to receive an input and display the indication in response to receiving the input.

4. The electronic communications device of claim 1, wherein the processor is further operable to display an indication of the error.

5. The electronic communications device of claim 1, wherein the electronic communications device comprises a wireless communications device.

6. The electronic communications device of claim 1, wherein the electronic communications device is communicatively coupled to a message server, and wherein the message is received from the message server, the message server having transmitted the message to the electronic communications device after receiving an original message and at least one of compressing or encrypting the original message prior to transmission.

7. A method for processing encrypted messages executed by an electronic communications device, the method comprising:
determining, by the electronic communications device, whether there is an error that prevents decrypting of an encrypted message; and
when there is an error that prevents the decrypting of the encrypted message, displaying, by the electronic communications device, an indication of how to correct the error, the indication of how to correct the error comprising a direction to use software on a personal computer.

8. The method of claim 7, wherein the indication further comprises an indication of how to obtain a key for use in decrypting the encrypted message.

9. The method of claim 7, further comprising receiving an input, and displaying the indication in response to receiving the input.

10. The method of claim 7, further comprising displaying an indication of the error.

11. A non-transitory computer-readable medium comprising instructions, which when executed by a processor of an electronic device, cause the processor to perform a method for processing encrypted messages, wherein the method comprises:
determining whether there is an error that prevents decrypting of an encrypted message; and
when there is an error that prevents the decrypting of the encrypted message, displaying an indication of how to correct the error, the indication of how to correct the error comprising a direction to use software on a personal computer.

12. An electronic communications device comprising:
a display; and
a processor coupled with the display, the processor being operable to determine whether there is an error that prevents processing of a cryptographically secured message, and
when there is an error that prevents the processing of the cryptographically secured message, display an indication of how to correct the error,
wherein the electronic communications device is further operable to be coupled to a personal computer, and wherein the indication of how to correct the error comprises a direction to use software on the personal computer.

13. The electronic communications device of claim 12, wherein the processing comprises utilizing a private key to decrypt an encrypted message.

14. The electronic communications device of claim 12, wherein the indication further comprises an indication of data that must be loaded onto the electronic communications device to correct the error.

15. The electronic communications device of claim 12, wherein the processor is further operable to receive an input and display the indication in response to receiving the input.

16. The electronic communications device of claim 12, wherein the processor is further operable to display an indication of the error.

17. The electronic communications device of claim 12, wherein the electronic communications device comprises a wireless communications device.

18. The electronic communications device of claim 12, wherein the electronic communications device is communicatively coupled to a message server, and wherein the message is received from the message server, the message server having transmitted the message to the electronic communications device after receiving an original message and at least one of compressing or encrypting the original message prior to transmission.

19. A method for processing cryptographically secured messages executed by an electronic communications device, the method comprising:
determining, by the electronic communications device, whether there is an error that prevents processing of a cryptographically secured message, and
when there is an error that prevents the processing of the cryptographically secured message, displaying, by the electronic communications device, an indication of how to correct the error, the indication of how to correct the error comprising a direction to use software on a personal computer.

20. The method of claim 19, wherein the processing comprises utilizing a private key to decrypt an encrypted message.

21. The method of claim 19, wherein the indication further comprises an indication of data that must be loaded to correct the error.

22. The method of claim 19, further comprising receiving an input, and displaying the indication in response to receiving the input.

23. The method of claim 19, further comprising displaying an indication of the error.

24. A non-transitory computer-readable medium comprising instructions, which when executed by a processor of an electronic device, cause the processor to perform a method for processing cryptographically secured messages, wherein the method comprises:

determining whether there is an error that prevents processing of a cryptographically secured message, and when there is an error that prevents the processing of the cryptographically secured message, displaying an indication of how to correct the error, the indication of how to correct the error comprising a direction to use software on a personal computer.

\* \* \* \* \*